(12) United States Patent
Stuart et al.

(10) Patent No.: US 7,231,033 B2
(45) Date of Patent: *Jun. 12, 2007

(54) SYSTEM AND METHOD FOR PROVIDING A SERVICE TO A CUSTOMER VIA A COMMUNICATION LINK

(76) Inventors: Robert O. Stuart, 5951 Camelback Ct., Indianapolis, IN (US) 46250; Scott P. Stuart, 771 Catherine St., SW, Atlanta, GA (US) 30310

( * ) Notice: Subject to any disclaimer, the term of this patent is extended or adjusted under 35 U.S.C. 154(b) by 0 days.

This patent is subject to a terminal disclaimer.

(21) Appl. No.: 11/364,064

(22) Filed: Feb. 28, 2006

(65) Prior Publication Data

US 2006/0140389 A1 Jun. 29, 2006

Related U.S. Application Data

(63) Continuation of application No. 11/031,933, filed on Jan. 7, 2005, which is a continuation of application No. 09/366,114, filed on Aug. 2, 1999, now Pat. No. 6,868,154.

(51) Int. Cl.
*H04M 5/00* (2006.01)
(52) U.S. Cl. ............... 379/265.07; 379/266.1; 379/309; 379/93.13; 379/35
(58) Field of Classification Search ............... 379/265.01–265.06
See application file for complete search history.

(56) References Cited

U.S. PATENT DOCUMENTS

| | | | |
|---|---|---|---|
| 3,689,930 A | 9/1972 | Strickland et al. | |
| 5,402,474 A | 3/1995 | Miller et al. | |
| 5,438,570 A | 8/1995 | Karras | |
| 5,590,171 A | 12/1996 | Howe et al. | |
| 5,696,811 A | 12/1997 | Maloney et al. | |
| 5,712,954 A | 1/1998 | Dezonno | |
| 5,729,597 A | 3/1998 | Bhusri | |
| 5,737,405 A | 4/1998 | Dezonno | |
| 5,757,904 A | 5/1998 | Anderson | |
| 5,787,164 A | 7/1998 | Haines et al. | |
| 5,790,635 A | 8/1998 | Dezonno | |
| 5,790,650 A | 8/1998 | Dunn et al. | |
| 5,818,907 A | 10/1998 | Maloney et al. | |
| 5,818,909 A | 10/1998 | Van Berkum et al. | |
| 5,854,825 A | 12/1998 | Mukaihara et al. | |
| 5,854,832 A | 12/1998 | Dezonno | |
| 5,878,113 A | 3/1999 | Bhusri | |
| 5,881,132 A | 3/1999 | O'Brien et al. | |
| 5,943,416 A * | 8/1999 | Gisby | 379/265.13 |

(Continued)

*Primary Examiner*—Fan Tsang
*Assistant Examiner*—Simon Sing
(74) *Attorney, Agent, or Firm*—Liell & McNeil (57) ABSTRACT

A system and a method for providing a service begins when a customer establishes a communication link, such as a telecommunications link, with a service provider, such as directory assistance. An exchange of information occurs, and a service, such as a telephone number or catalog order, is provided by the service provider at least in part via the communication link. Before the customer terminates the communication link, he or she is requested to provide feedback, which preferably relates to the quality of the service provided. In another embodiment, the exchange of information is monitored, and an action, such as notifying a supervisor, is taken if a predetermined condition is detected, such as usage of unacceptable language by a call handling agent.

41 Claims, 8 Drawing Sheets

U.S. PATENT DOCUMENTS

| | | |
|---|---|---|
| 5,946,375 A | 8/1999 | Pattison et al. |
| 5,970,121 A | 10/1999 | Homayoun |
| 6,047,060 A | 4/2000 | Fedorov et al. |
| 6,055,514 A | 4/2000 | Wren |
| 6,070,145 A | 5/2000 | Pinsley et al. |
| 6,163,607 A | 12/2000 | Bogart et al. |
| 6,363,145 B1 * | 3/2002 | Shaffer et al. ......... 379/265.02 |
| 6,427,002 B2 * | 7/2002 | Campbell et al. ........ 379/88.01 |

* cited by examiner

SYSTEM AND METHOD FOR PROVIDING A SERVICE TO A CUSTOMER VIA A COMMUNICATION LINK

RELATION TO OTHER PATIENT APPLICATION

This application is a continuation of patent application Ser. No. 11/031,933, filed Jan. 7, 2005 with the same title, which is a continuation of Ser. No. 09/366,114 filed Aug. 2, 1999, with the same title, now U.S. Pat. No. 6,868,154.

TECHNICAL FIELD

This invention relates generally to systems and methods for providing services via a communication link, and more specifically, to methods and systems for obtaining feedback and monitoring the provision of services.

BACKGROUND ART

Although a critical determinant in the success of any business is the quality of the products or services offered by a particular company, quality takes on an arguably greater role in the service industry. In the telecommunications call handling service industry, where call agents interact with thousands of customers daily, satisfying customer expectations literally defines the parameters of success. In contrast to manufacturing entities, where quality can be readily quantified by applying statistical process controls to the manufacturing process, service companies, such as telecommunications call centers, often have no comparable method of accurately monitoring and measuring the quality of a service provided to a customer. As a result, many telecommunications call handling businesses rely to a greater extent on internal monitoring systems to ensure that call handling agents perform within accepted business practices, rather than attempting to measure an external customer's subjective perception of a service encounter.

Current telecommunications call handling businesses attempt to measure customer satisfaction in a two-fold approach. First, supervisory personnel monitor a percentage of calls in progress to determine whether the call handling agent is adhering to established company practices. Secondly, the service company attempts to collect customer feedback from the service contact by conducting telephone interviews with customers of the service.

Many telecommunications companies engaged in live agent call handling rely primarily on-internal measurements derived from service observing to determine the level of accuracy and courtesy provided by their call attendants to the calling customers. These systems typically utilize random monitoring of customer contacts by special supervisory agents from remote locations. Once a predetermined number of customer contacts has been monitored, reports are generated in which errors or irregularities observed are calculated as service indices and summarized for various operational levels.

Although this monitoring system has some success in measuring certain technical elements of the call attendants' job, the monitoring system is unable to measure quality from the customers' perspective. Additionally, increasing employee concerns of monitoring has led both unions and legislatures to restrict or prohibit this method of service oversight.

Telephone interviews with customers and survey questionnaires are utilized to supplement these internal measurement systems. Outside market research firms are often used to ensure total objectivity. These surveys normally consist of customers randomly selected from a transaction database such as a billing file, new order file, repair or maintenance request or other such customer activity. A series of specific service questions is then asked with the data summarized for the various levels of management. Due to the cost of the interviews, the sample size typically is not statistically valid for any one month but is instead summarized for a rolling three month interval.

This type of telephone interview provides some needed input from the customer to management, but inherent problems prevent the system from being effective. For example, directory assistance and long distance operators work in large team configurations with three or more offices often serving large areas. Customer evaluations can be made for the entire area but individual office performance generally can not be determined. Moreover, results are almost never timely, due to the lengthy interview process and the small sample size. The Bell System divestiture has caused even more significant problems. The interview results are often suspect due to customer confusion between toll and directory assistance operators as well as by customer confusion as to what company actually provided the service.

Additionally, the validity and usefulness of the survey depends on many factors, such as: the sample size; whether the response is from the actual customer that received the service; whether the information was provided in a timely manner; whether the individual employee performance was measured; whether the customer understands precisely what service factor is being evaluated; whether the customer knows which company provided the service; and, whether any customer comments are available for management review. For example, calls originating from coin telephones and/or hotel/motels, etc. are not sampled by this process. This type of traffic can represent over 50% of the total volume.

Most telecommunications call handling centers use some type of telephonic switch to automatically route incoming customer telephone calls to available call handling agents. Perhaps the most common of these telephonic switches is the automatic call distributor (ACD), a type of switch well-known in the art that generally includes a multiport switch controlled by a central processing unit to interconnect the calling customers to the call handling agents. In addition to routing calls, the ACD is capable or processing and reporting information on various aspects of the calls it routes, such as time, duration and identifying information. The increasing role of the ACD in the call handling industry has allowed for a partial automation of traditional monitoring methods.

With respect to known patents in this field, several inventions have been specifically directed toward improving upon the general methods of monitoring and measuring the service provided by a telecommunications call attendant, discussed above. All of these inventions are concerned with partially automating a portion of the typical call monitoring method utilizing a live supervisor.

In U.S. Pat. No. 5,818,907, Maloney, et al. teaches a method and system for automatically monitoring the performance quality of call center service representatives. With this invention, a supervisor is capable of scheduling a pre-determined number of calls to be recorded for a particular service representative within a specific pre-determined time interval. The supervisor then may listen to the recorded calls at the supervisor's convenience. In U.S. Pat. No. 5,790,635 to Dezonno, a system and method for automatic monitoring of active telephone calls in a telephonic switch is taught. Utilizing this method and system, an ACD monitoring system measures the length of time of active incoming telephone calls. The calls are then organized in order of decreasing duration. A live supervisor then has the option of monitoring only those calls which exceed a pre-determined call duration value. The rationale for this approach is that an exceedingly lengthy telephone call likely indicates that the call is not being handled in an efficient and prompt manner.

In U.S. Pat. No. 5,854,832 to Dezonno, a system and method is taught in which a monitoring system detects, for an incoming telephone call, the length of time an agent is talking, the length of time a caller is talking, the length of time neither party is talking and, finally the total length of the call. It is believed that, with this invention, excessively talkative agents can be identified. In U.S. Pat. No. 5,712,954, Dezonno teaches a system and method for monitoring the audio power level of an agent's speech in a telephonic switch. This invention detects the audio power level of an agent's speech and compares this level to a predetermined minimum and maximum threshold level. Correspondingly, an appropriate message is displayed on the agent's terminal to "Speak Softer" or "Speak Louder." In U.S. Pat. No. 5,737,405 also to Dezonno, an apparatus and method is taught for detecting conversation interruptions in a telephonic switch. Utilizing this invention, both the caller's speech and the agent's speech are detected using audio signal detectors. When the caller's speech and the agent's speech are simultaneously detected, a conversation interruption has occurred and a supervisor is notified. Finally, in U.S. Pat. No. 5,818,909 to Van Berkum et al. an agent speech detector system and method is taught in which a speech detector monitors the voice of an agent during a call routed to the agent by a telephonic switch. If the speech detector detects that the agent did not speak during the telephone call, the speech detector sends this information to a supervisor's computer system. It is important to note that no known system is directed specifically towards measuring an external customer's satisfaction in real time at the point of the customer contact.

DISCLOSURE OF THE INVENTION

In one preferred aspect, the present invention is intended to provide a method and system for retrieving customer feedback regarding the customer's service experience with a call handling agent in real time at the point of customer contact.

In another preferred aspect, the present invention is intended to provide a method and system for retrieving customer feedback regarding the customer's service experience that assures that the customer's evaluation, in fact: is from the customer who actually utilized the service; refers to the specific agent that handled the customer's call; and correspondingly, refers to the actual service provider that provided the service.

In still another preferred aspect, the present invention is intended to provide a method and system for monitoring an exchange of information between a customer and a service provider, preferably to ensure that an appropriate level of service quality is provided to the customer.

In both embodiments of the invention, a customer establishes a communication link with a service provider, such as via a telephone. In one embodiment, a service, such as telephone directory assistance information, is provided to the customer at least in part via the communication link, and the customer is requested to provide feedback before the communication link is terminated by the customer. In another embodiment, the exchange of information between the customer and the service provider is monitored. If the monitor detects a predetermined condition, such as a voice tone change or certain voiced statements or keyed information, an action is triggered. The action might be to alert a supervisor, record data, such as which agent handled the call, or request that the customer provide feedback regarding some aspect of their perceptions of the agent and/or the service.

In accordance with another aspect of the invention, a customer feedback measurement system for use with a telephonic switch utilizes a digitizer announcement means and a customer response and input means to measure customer opinion of operator courtesy, tone, accuracy, and speed or promptness of service. A customer feedback measurement unit (CFMU) couples a digitized announcement means with both a customer response input mechanism (CRIM) and a customer comment recording mechanism (CCRM). The CFMU is attached to a telecommunications server, preferably some type of telephonic switch such as an automatic call distributor. The CFMU provides the flexibility to operate in several modes. Specifically, the CFMU may be engaged for every customer contact, for only those calls in which the call handling agent requests that the CFMU be engaged, for only those calls in which the calling customer requests that the CFMU be engaged, and, in the preferred embodiment, the CFMU is programmed to intermittently engage for every variable Nth call in order to produce a statistically valid random sampling of calls.

The digitized announcement means is capable of providing various digitized announcement messages to the caller at various points throughout the call. These messages may furnish the customer with information or may request the customer to take a specific action, such as input information. For example, a message may be given to the caller at the beginning of the call which tells the caller, "Please evaluate your perfection of this call upon completion of the call," or a message may be given at the end of the call which asks the caller, "Please evaluate this call as either excellent, fair, or poor."

The CFMU is comprised of a number of means for accepting and recording customer input from a variety of sources. Specifically, the CRIM may include a keyed input means for accepting, recognizing and recording customer input from a telephone keypad, computer keyboard, or other keying-type device. Additionally, the CRIM mar include a voice recognition means for accepting, translating and recording verbalized customer input. The CRIM operates by accepting and storing either a keyed response or a verbalized caller response to a quality of service question offered by the digitized announcement device, such as "Was the operator courteous?" Finally, the CCRM could have the capability of recording customer comments.

A reporting means allows for full flexibility in summarizing, analyzing and reporting the customer responses. The reporting means has the capability of producing many different types of reports, including both statistical and graphical reports with trend and norm comparisons for various levels of organizational detail. For example, the percent of calls evaluated excellent, good, fair, poor, satisfied, answered without delay, handled professionally, with no trouble hearing, etc. may be summarized by: an individual operator, a particular supervisor's group, a particular office level, as well as by call type, call class, call source, time (month, week, day, period of day), and real time.

In accordance with another aspect of the first function of the invention, a customer feedback measurement method is provided for measuring customer opinion of the quality of service given to the customer by a call handling agent in real time at the point of service contact with the agent. The method comprises the step of utilizing a digitized announcement means to inform and request the customer to input via a telephone keypad, vocalization, or other means, the customer's opinion of the service contact by having the customer respond to a question or series of questions relating to various quality aspects of the service encounter. The method further comprises the step of storing and recording the various customer responses via an appropriate mechanism based on the type of input the customer utilizes in responding to the service questions. Finally, the method comprises the step of summarizing, analyzing, and reporting the results of the customers feedback to a plurality of individuals utilizing a variety of display means.

In accordance with one aspect of the second function of the invention, a conversation monitoring system for use with a telephonic switch utilizes voice recognition and speech analysis technology to monitor the conversation between a calling customer and a call handling agent.

A voice recognition unit monitors a call in order to recognize various key words, phrases, or other non-word utterances, such as uh or um—vocalized by either the calling customer or the call handling agent at any point during the call. These key words and phrases may relate to quality of service issues or may relate to marketing or other business issues. Key words and phrases vocalized by the customer which may be indicative of quality of service issues include words and phrases such as "dumb," "stupid," "poor," "slow," "rude," "not helpful," "inattentive," and profane language, among others. Key words and phrases vocalized by the call handling agent which may be indicative of quality of service issues include words and phrases such as "I'm sorry," "please repeat," and unauthorized words or phrases such as expletives. Key words or phrases vocalized by the operator which may relate to marketing or other types of business issues include words or phrases such as call branding requirements by a particular service provider; and required marketing questions such as "Would you be interested in . . . ?" The voice recognition means is capable of monitoring the conversation at all points during the call, but preferably during the following critical conversation time points: while the customer is on-line, but prior to the position connect; during the call while the customer is on hold; after the position release but prior to the audio response unit; or after the audio response unit but before the call is released. When the invention recognizes a particular key word or phrase, the invention may automatically generate a report or may automatically transfer the call to a supervisor, or take some other suitable action.

In addition to voice recognition analysis, the invention preferably utilizes state of the art speech analysis technology to monitor the conversation. In contrast to voice recognition technology, which is capable or recognizing a specific word or phrase from a vocalization, speech analysis attempts to recognize certain qualitative aspects of the speech itself, such as an increasing volume, which may indicate increasing stress, or a sudden change in tonal quality, which may indicate customer confusion.

In accordance with another aspect of the second function of the invention, a conversation monitoring method for use with a telephonic switch utilizes voice recognition and speech analysis technology to monitor the conversation between a calling customer and a call handling agent. The method comprises the step of utilizing a voice recognition means as well as a speech analysis means to monitor the entirety, or portions, of a conversation between a calling customer and a call handling agent. The voice recognition means uses current voice recognition technology to continuously monitor a selected call to a call handling agent in order to recognize certain key words or phrases. These key words or phrases act as triggers, and once identified by the voice recognition means, cause the invention to take a specific action based on the specific trigger encountered. The speech analysis means uses state of the art speech analysis technology to recognize certain key qualitative aspects of the speech of either the customer or the call handling agent that are indicative of a potential quality of service issue.

DETAILED DISCLOSURE OF THE INVENTION

The invention possesses two related embodiments. First, the invention provides a method and system for allowing customers to provide immediate feedback on their service experience. Secondly, the invention provides a method and system for automatically monitoring the quality of service provided to the customer.

In accordance with the first embodiment of the invention, a customer feedback measurement system (CFMS) for use with a telephonic switch utilizes a digitized announcement means and a customer response and input means to measure customer perception of service given by a call handling agent. In the preferred embodiment, the agent is a directory assistance operator who provides calling customers identifying information (i.e., phone numbers) regarding third parties.

Figure 1:
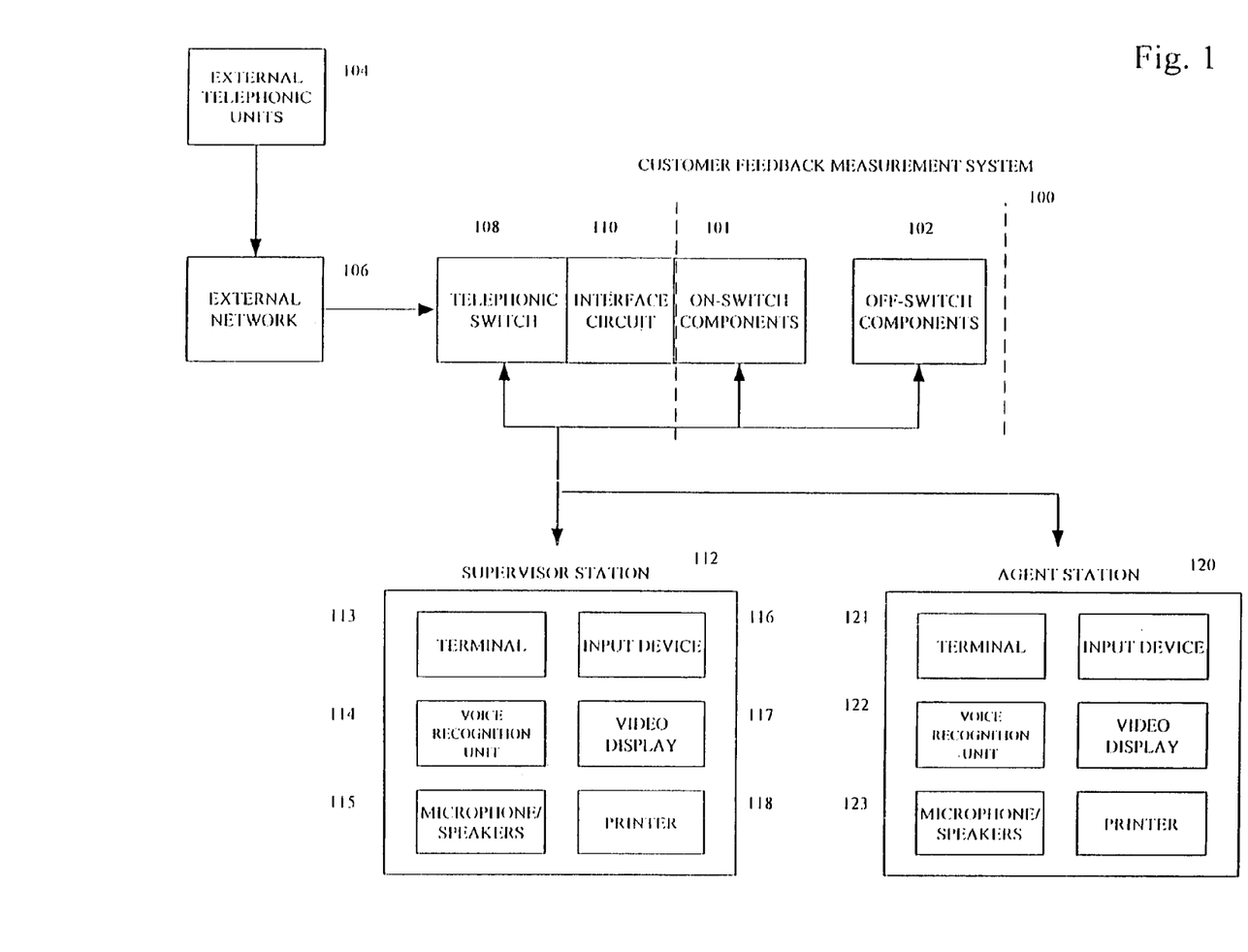
FIG. 1 provides a schematic block diagram showing the relationship of the customer feedback measurement system to a telephonic switch.

Referring now to the drawings, FIG. 1 is a block diagram illustrating generally a preferred embodiment of the CFMS. The CFMS 100 preferably operates with the public switched telephone network (PSTN) 106, and is operational as well for packet-switched networks, such as ISDN, or the Internet, to route a communication from a calling party utilizing an external telephonic unit 104 through a telecommunications server, preferably a telephonic switch 108 such as an ACD, to a call handling agent station 120. The agent station may consist of an agent terminal 121, an agent input device 124, an agent video display 125, an agent printer 126, an agent voice recognition unit 122, and an agent microphone and speakers 123. The ACD switch 108 possesses at least the minimum level of functionality of present day ACD switches which are well known in the prior art. In a preferred embodiment shown in FIG. 2, the CFMS 100 consists of both on-switch and off-switch components. The on-switch components 101 may consist of a customer feedback measurement unit (CFMU) 201, an engagement control means 202, a transmission means 204 and a supervisory means 203. The off-switch components 102 mail consist of a storage means 205, an analysis means 206, and a reporting means 207.

Figure 3:
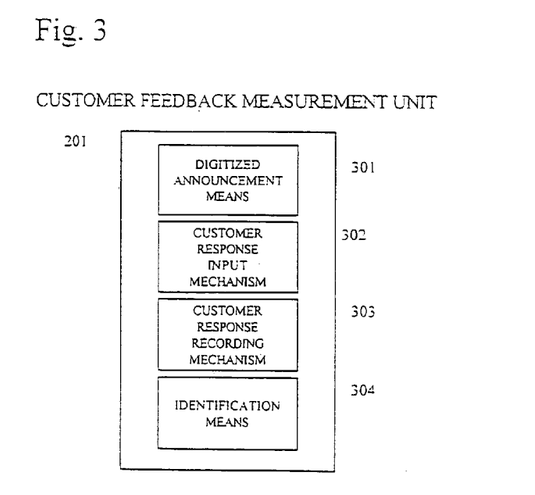
FIG. 3 provides a schematic block diagram of the components that comprise the customer feedback measurement unit.

Referring now in addition to FIG. 3, CFMU 201 is preferably comprised of a digitized announcement means 301, a customer response input mechanism (CRIM) 302, a customer comment recording mechanism (CCRM) 303, and an identification means 304. The CFMU 201 is operably coupled to a telephonic switch 108, preferably an automatic call distributor, that routes incoming customer calls to a plurality of available call handling agents. The digitizer announcement means 301 consists of a programmable, digitized, announcement device capable of providing various digitized announcement messages to the caller at various points throughout the call. These messages may furnish the customer with information or may request the customer to take a specific action, such as input information. For example, a message may be given to the caller at the beginning of the call which tells the caller, "Please evaluate your perception of this call upon completion of the call," or a message may be given at the end of the call which asks the caller, "Please evaluate this call as either excellent, fair, or poor." The digitized announcement means 301 may request customer input on any number of quality of service aspects, including agent courtesy, tone, accuracy, and speed or promptness or service, among other aspects.

Figure 4:
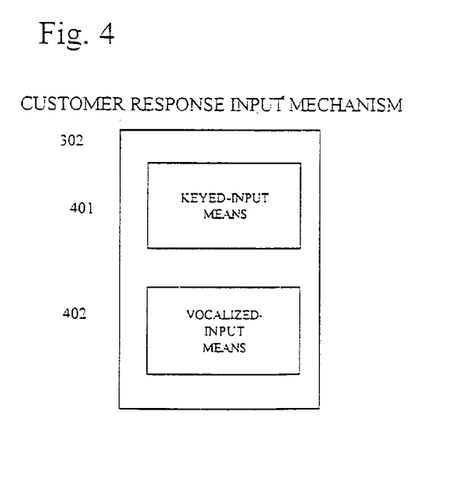
FIG. 4 provides a schematic block diagram of the components that comprise the customer response input mechanism.
Figure 5:
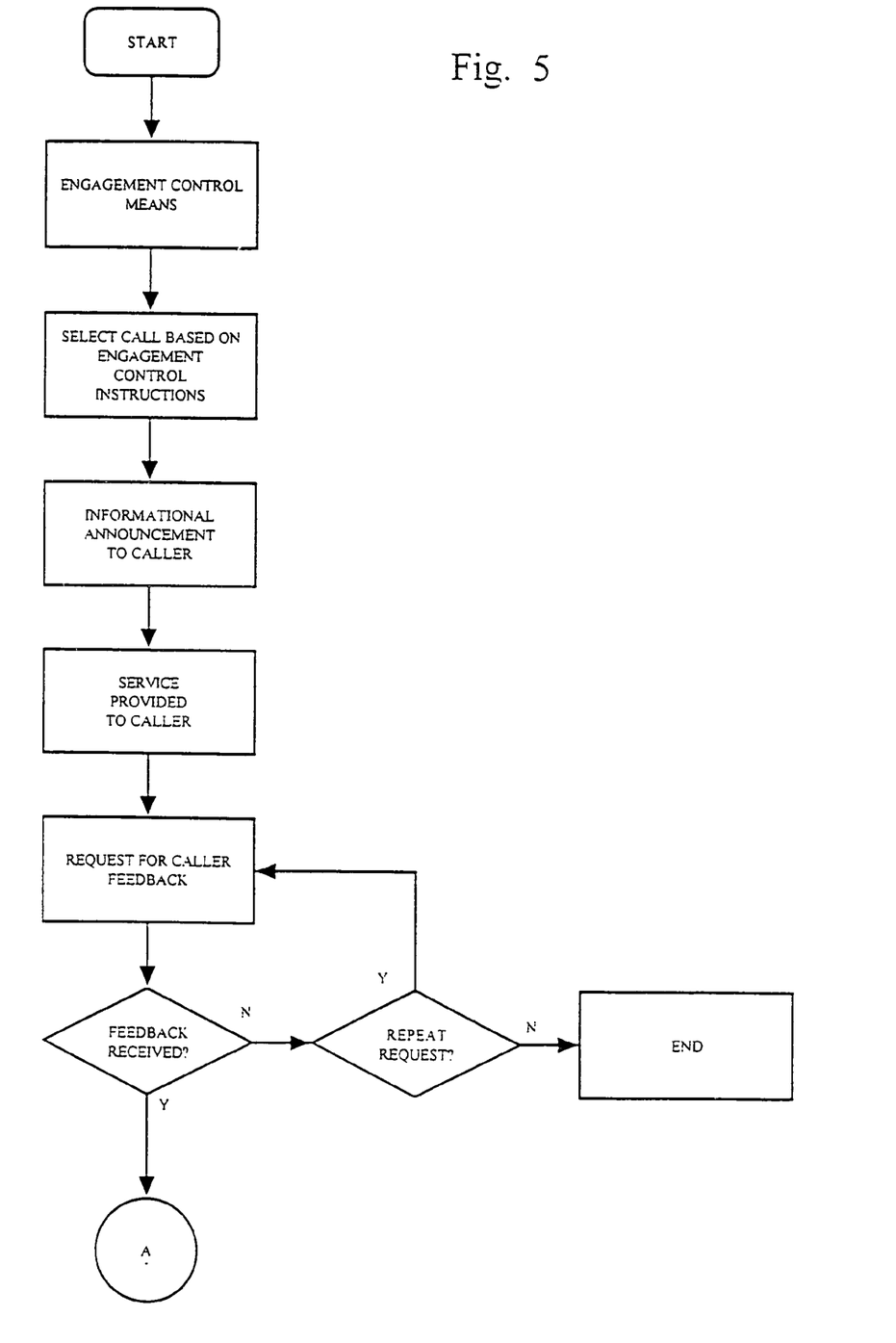
FIGS. 5-7 show a flow diagram for the customer feedback measurement system.
Figure 6:
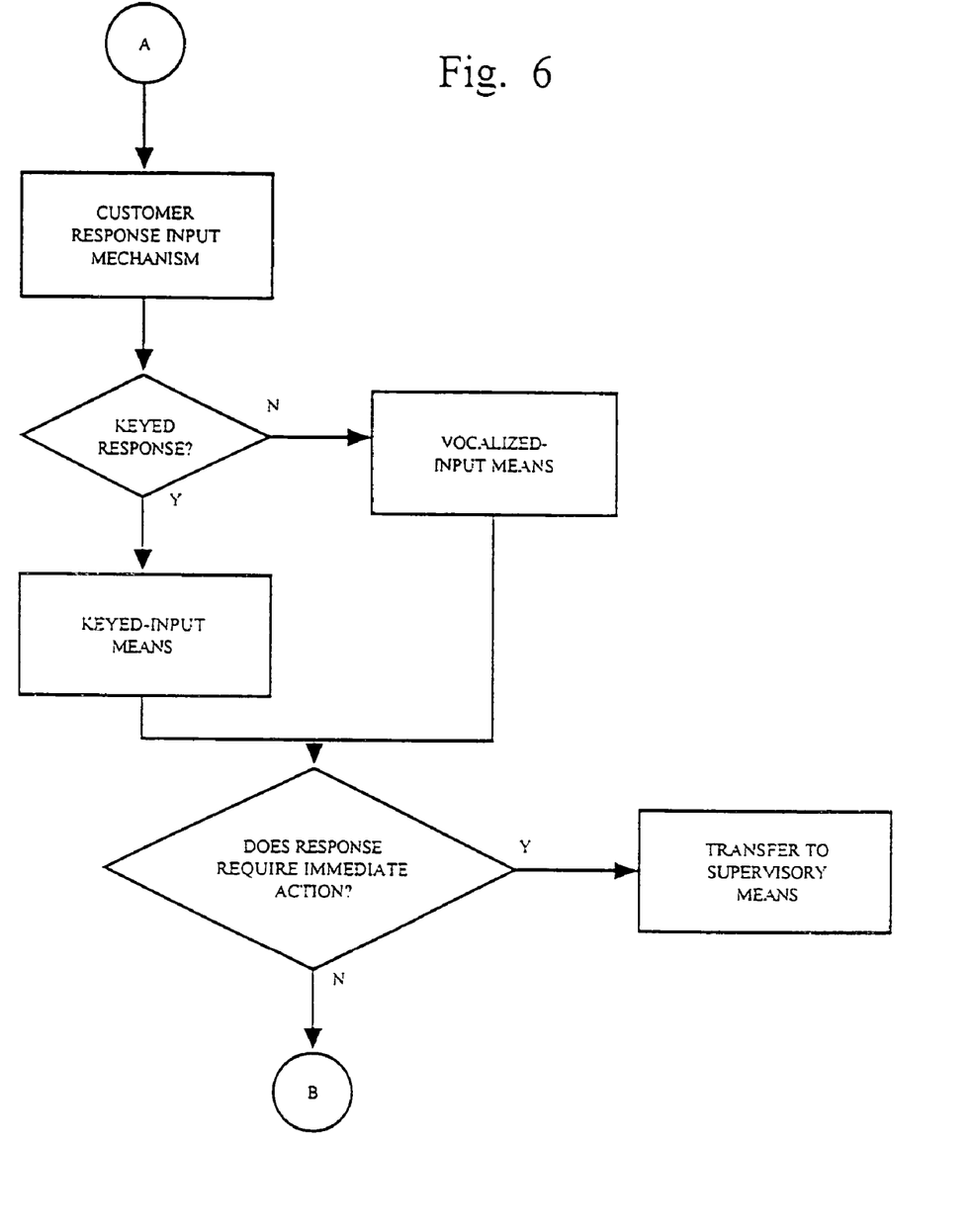
Figure 7:
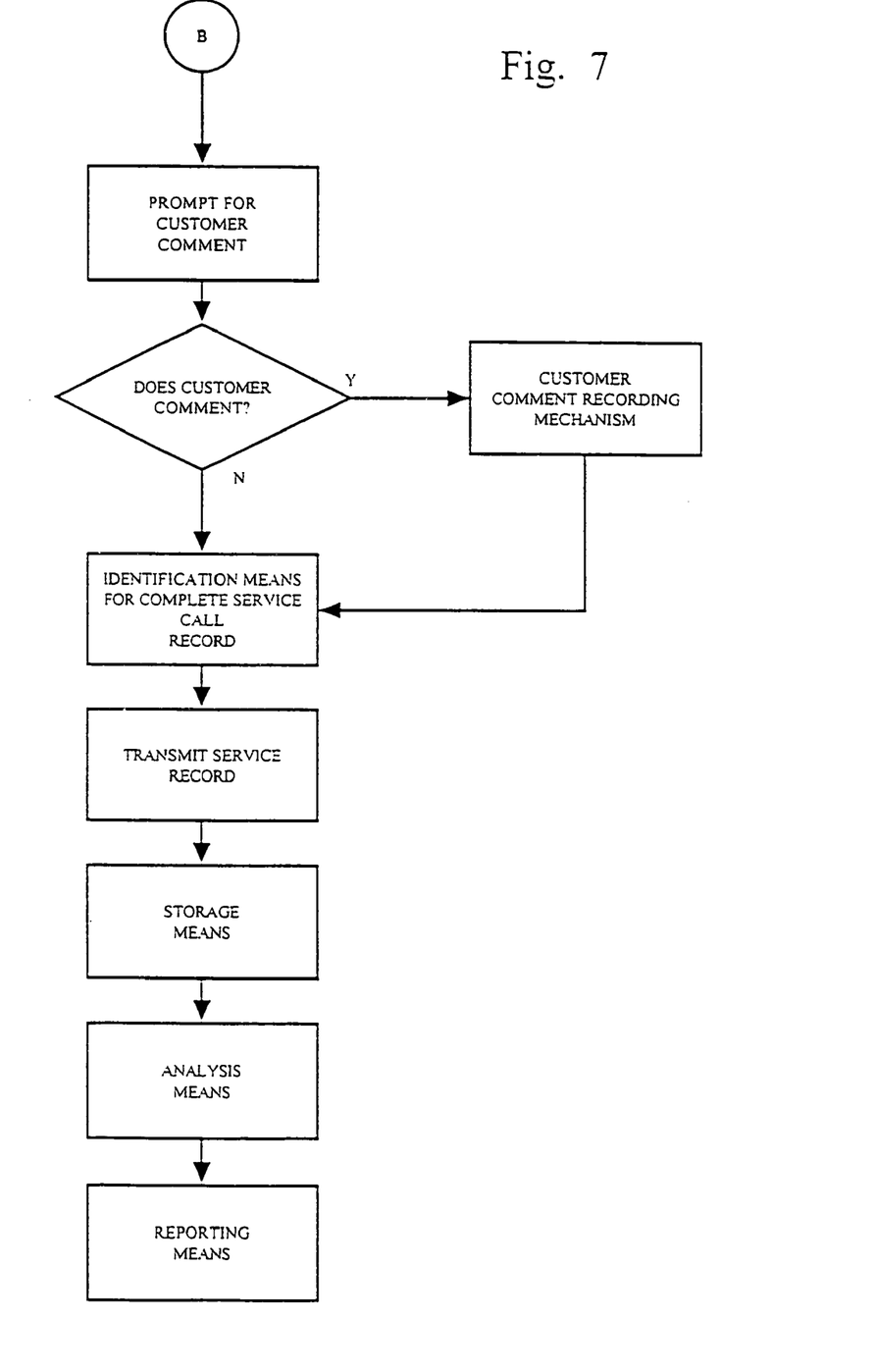

The CFMU 201 is comprised of a number of means for accepting and recording customer input and comments from a variety of sources. Specifically, FIG. 4 shows that the CRIM 302 may be comprised of a keyed-input means 401 which consists of that hardware and software necessary for accepting, recognizing and recording customer input from a telephone keypad, computer keyboard, or other keying-type device. For instance, a customer might respond to a feedback request and press the "3" key on his or her telephone keypad. The tone produced by this action would be recognized as a 3 and the number 3 recorded in an appropriate field. Additionally, the CRIM 302 may include a vocalized input means 402 that consists of that voice recognition means necessary for accepting, recognizing and recording verbalized customer input. For instance, a spoken word could be recognized and the word recorded as ASCII code or in some other manner that facilitates later processing and analysis. The CRIM 302 operates by accepting and storing either a keyed response or a verbalized caller response to a quality of service question offered by the digitized announcement device 301, such as "Was the operator courteous?" A recognized "yes" or "no" might be recorded as a 1 or 0 respectively. Finally, the CCRM 303 consists of that hardware and software necessary for recording customer comments for later playback.

Once the CFMU 201 receives and stores the customer responses and customer comments, if any, the CFMU 201 formulates a complete service call record by associating key identifying information with the customer responses. The CFMU 201 performs this step by utilizing an identification means 304 that interacts with the existing software in the ACD 108 to gather key identifying call detail information. This identifying information mass include the particular call classification, such as coin, non-coin, or hotel/motel, the specific call type, such as collect, calling card, $3^{rd}$ number, or sent paid, the call handling agent identification code, the originating calling number, the specific local or long distance carrier responsible for transporting the call, and many other relevant types of information.

Figure 2:
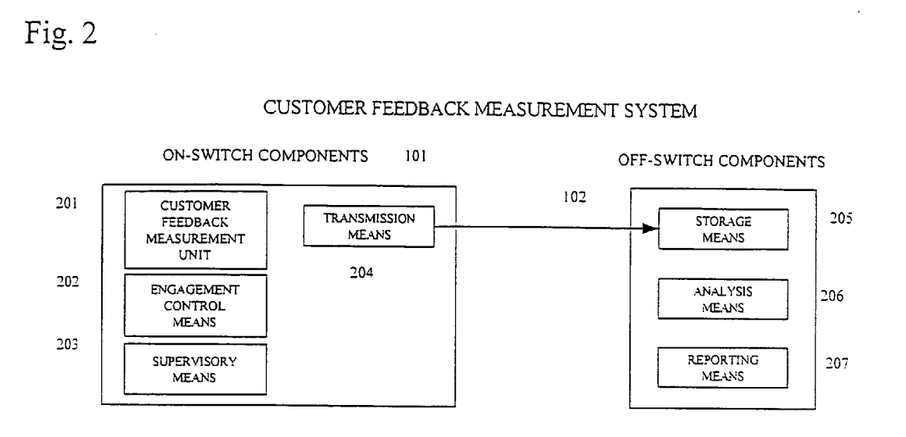
FIG. 2 provides a schematic block diagram showing the separation of on-switch and off-switch components of the invention in a preferred embodiment.

Once the CFMU 201 has formulated the complete service call record, a transmission means 204 transmits the complete service call record to a central processing site for storage, analysis, and report generation. Those skilled in the art will understand that the transmission means 204 consists of that hardware and software necessary to transmit the stored information to a processing site.

Once transmitted to a central processing site, an analysis means 206 is used to summarize and analyze the data according to both default and management-specified parameters.

The reporting means 207 preferably allows for full flexibility in summarizing, analyzing and reporting the customer responses. The reporting means 207 has the capability of producing many different types of reports, including both statistical and graphical reports with trend and norm comparisons for various levels of organizational detail. For example, the percent of calls evaluated excellent, good, fair, poor, satisfied, answered without delay, handled professionally, with no trouble hearing, etc. may be summarized by: an individual operator, a particular supervisor's group, a particular office level, as well as by call type, call class, call source, time (month, week, day, period of day), and real time, among other types of reports. Those skilled in the art will understand that the reporting means 207 includes all types of hardware and software necessary to provide multiple report formats, including printers, video display monitors, audio capabilities, and other essential hardware and software.

In addition to customer feedback on the perceived qualitative aspects of service given by a call handling agent, the scope of the invention is further intended to include measuring customer feedback on the use of specific marketing tools used by agents when handling the calls. Examples of the types of marketing tools employed by agents while handling calls include the use of key marketing phrases by the agent, such as call branding, or words and phrases indicative of a particular marketing campaign or strategy. The invention makes it possible to match customer perception with specific marketing tools or programs in real time at the point of customer contact.

The CFMS 100 provides the flexibility to operate in various modes according to specific engagement instructions contained within an engagement control means 202. Those skilled in the art will understand the basic programming involved in programming this type of engagement control means 202. Specifically, the CFMS 100 may operate in at least three distinct engagement modes, which include: (1) continuous; (2) auto-sampling; and (3) manual. In the preferred embodiment, the CFMS 100 operates in auto-sampling mode. Under auto-sampling, the CFMS 100 is programmed to intermittently engage for every variable Nth call in order to produce a statistically valid random sampling of calls. A statistical sub-module, based on management-specified parameters, randomly selects calls for the CFMS 100 which ensure a statistically valid Nth sampling function. The statistical sub-module will determine the Nth factor sample size parameters. The invention also contemplates screening circuits that could control the class and type of call sampled as well as the number of calls sampled by office, manager group and individual operator. In continuous mode, the CFMS 100 is engaged for every customer contact for a specified period of time. In manual mode, the CFMS 100 is engaged only for those calls in which the call handling agent requests that the CFMS 100 be engaged, or only for those calls in which the calling customer requests that the CFMS 100 be engaged.

A supervisory means 203 includes the hardware and software necessary for providing a live on-line service evaluator to receive calls that are engaged by the customer feedback measurement unit 201 for manual, real time service evaluation. A supervisory control means determines which calls engaged by the CFMU 201 are sent to the supervisor evaluator. This supervisory control means can operate in both an automatic and manual mode. In automatic mode, the supervisory control means automatically sends those calls engaged by the CFMU 201 to the supervisor evaluator when a specific critical service indicator is triggered. In other words, an action is triggered when a predetermined condition is detected. Such a critical service indicator may include a customer response to a quality of service question that exceeds a minimum threshold of service evaluation. The supervisory control means may also operate in manual mode. In manual mode, both the operator and the customer can specifically request that the engaged call be transferred to the live supervisor evaluator. Additionally, the supervisory means 203 includes means for allowing management call back when a particular customer requests a management call back.

Monitoring Conversation

Figure 8:
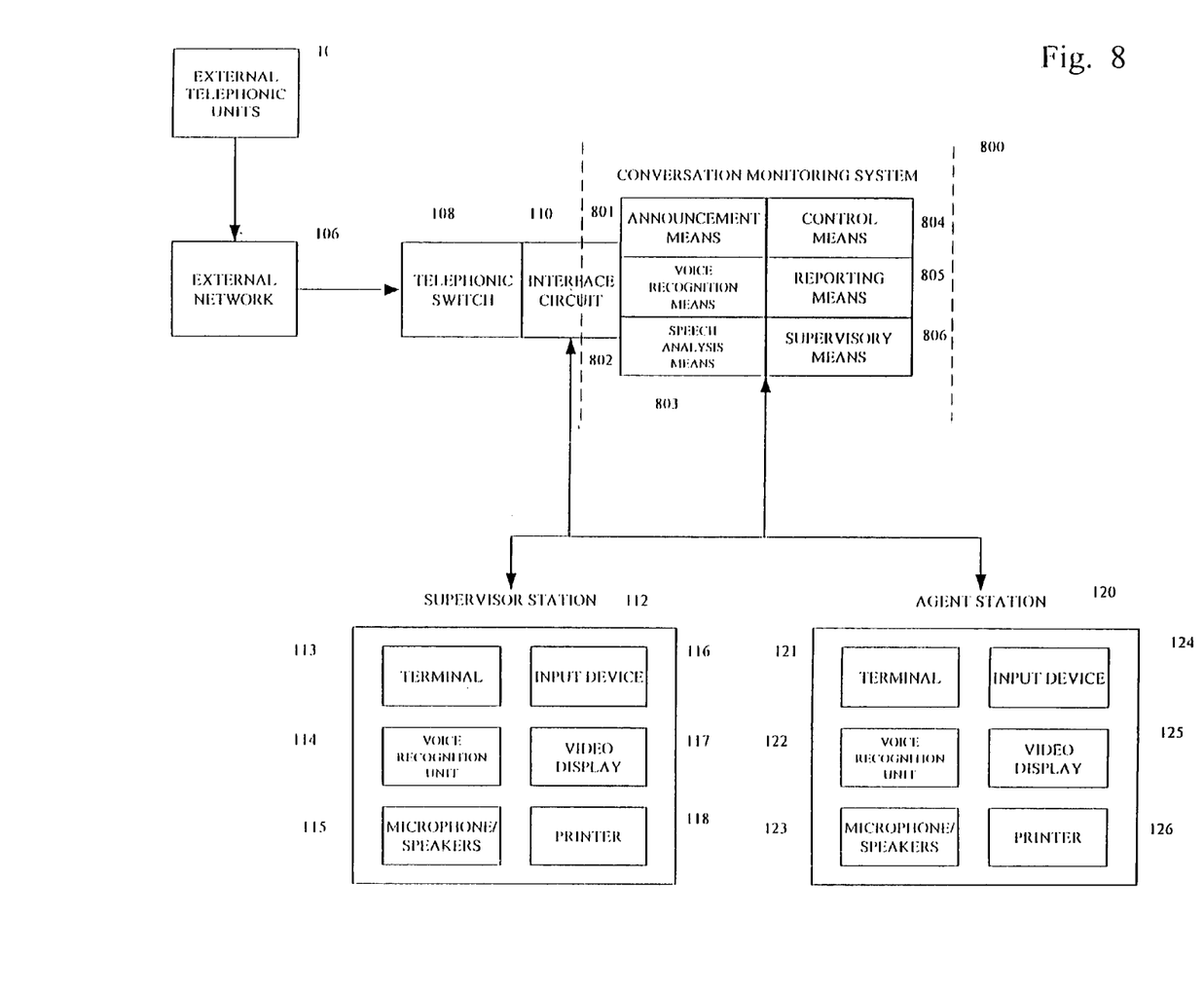
FIG. 8 provides a schematic block diagram showing the relationship of the conversation monitoring system to a telephonic switch.
Figure 9:
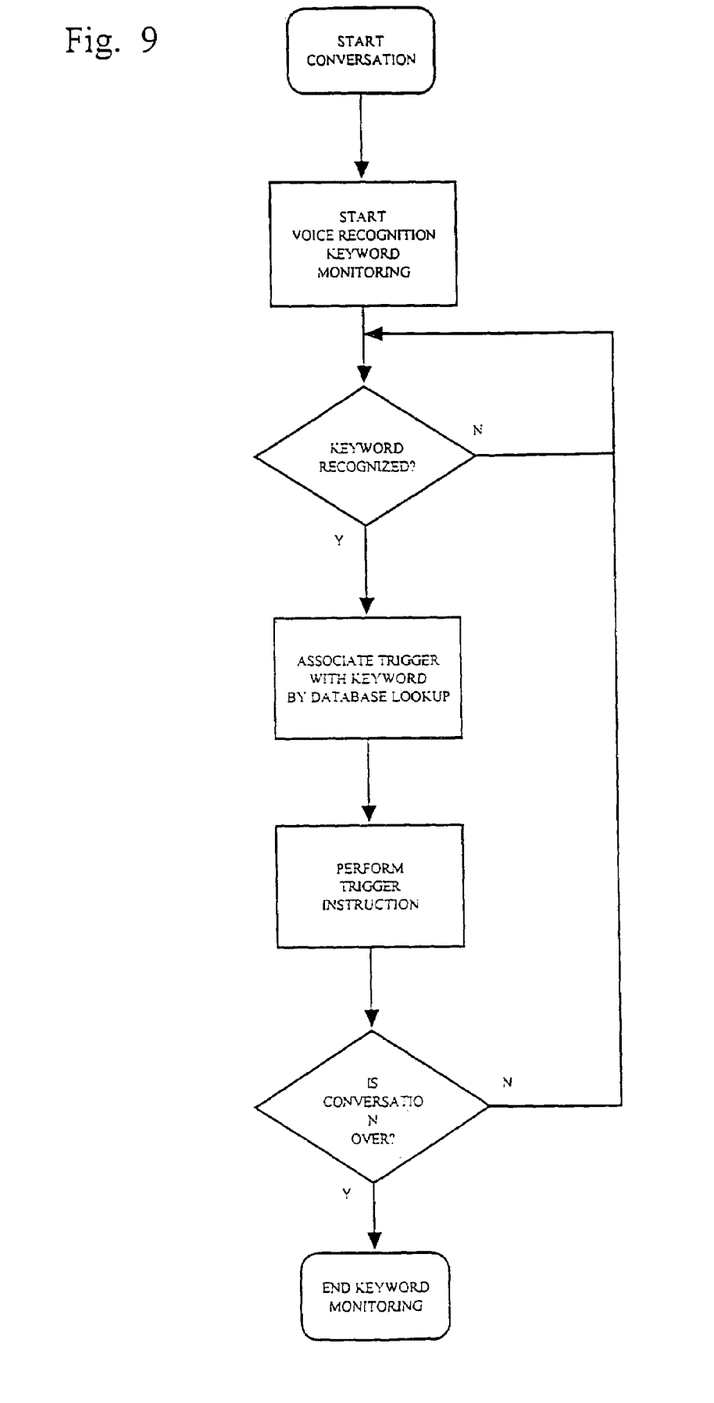
FIG. 9 shows a flow diagram for the voice recognition keyword monitoring by the conversation monitoring system.
Figure 10:
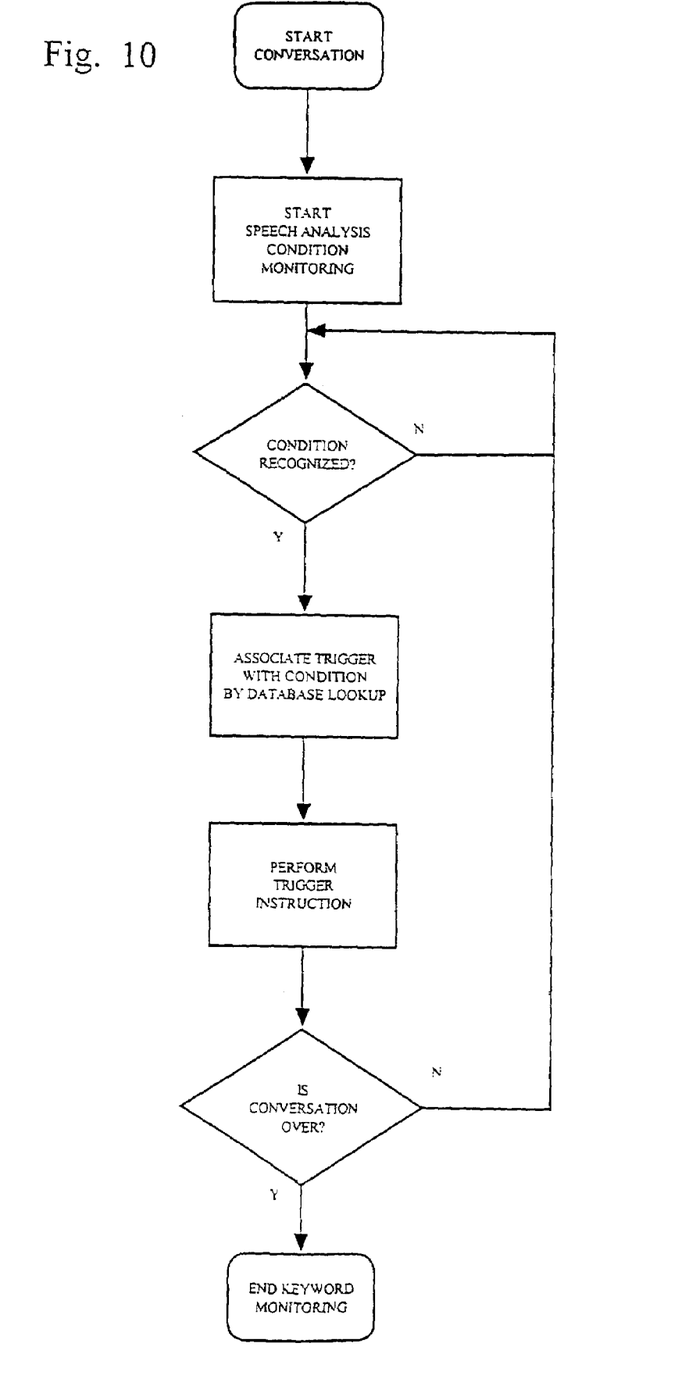
FIG. 10 shows a flow diagram for the speech analysis monitoring by the conversation monitoring system.

Referring now to FIG. 3, in accordance with one embodiment of the second function of the invention, a conversation monitoring system (CMS) 800 for use with a telephonic switch 108 utilizes voice recognition and speech analysis technology to monitor the conversation between a calling customer and a call handling agent, which may be live or automated. Apart from monitoring a verbal conversation, the present invention contemplates monitoring of any service related exchange of information, such as keyed information, that occurs between a customer and a service provider. The CMS 800 is preferably comprised of an announcement means 801, a voice recognition means 802, a speech analysis means 803, a control means 804, a reporting means 805 and a supervisory means 806.

An announcement means 801 is comprised of a programmable, digitized announcement device capable of providing various digitized announcements at various points throughout the call. In a preferred embodiment, the announcement device may announce to the caller at the beginning of the call that the call may be monitored for quality purposes.

A voice recognition means may be comprised or both a speech recognition subsystem and a keyed input recognition subsystem. The speech recognition subsystem is capable of recognizing vocalized utterances while the keyed entry recognition subsystem is capable of recognizing keyed information, such as that generated by pressing characters on a computer keyboard or the tones produced by a telephone keypad. In a preferred embodiment, the voice recognition means 802 monitors a call in order to recognize various key words, phrases or other utterances by either the calling customer or the call handling agent at any point during the call. These key words or phrases act as triggers, and once identified by the voice recognition means, cause the invention to take a specific action based on the specific trigger encountered. These key words and phrases may relate to quality of service issues or may relate to marketing or other business issues. Statements vocalized by the customer which may be indicative of quality of service issues include words and phrases such as "dumb," "stupid," "poor," "slow," "rude," "not helpful," "inattentive," and profane language, among others. Statements vocalized by the call handling agent which may be indicative of quality of service issues include words and phrases such as "I'm sorry," "please repeat," and unauthorized words or phrases such as expletives. Key words or phrases vocalized by the operator which may relate to marketing or other types of business issues include words or phrases such as call branding requirements by a particular service provider; and required marketing questions such as "Would you be interested in . . . ?" The voice recognition means 602 is capable of monitoring the conversation at all points during the call, but preferably during the following critical conversation time points: while the customer is on-line, but prior to the position connect; during the call while the customer is on hold; after the position release but prior to the audio response unit; or after the audio response unit but before the call is released. When the invention recognizes a particular key word or phrase, the invention may automatically generate a report or may automatically transfer the call to a supervisor, based on the particular trigger instruction associated with the specific key word or phrase.

Apart from monitoring for certain key words, the present invention also contemplates monitoring for other non-word utterances, such as repeated "uhs" or "ums" that may indicate confusion or some other noteworthy aspect of the exchange of information.

In addition to voice recognition analysis, the invention preferably utilizes state of the art speech analysis technology to monitor the conversation. A speech analysis means 803 is comprised of a programmable speech analysis device which includes a voice tonal change detector and/or a voice volume change detector. The speech analysis means uses current speech analysis technology to recognize certain key qualitative aspects of the speech of either the customer or the call handling agent that are of interest, such as those indicative of a potential quality of service issue. In contrast to voice recognition technology, which is capable of recognizing a specific word or phrase from a vocalization, speech analysis attempts to recognize certain qualitative aspects of the speech itself, such as an increasing volume, which may indicate increasing stress, or a sudden change in tonal quality, which may indicate customer confusion. The speech analysis means preferably performs by establishing a baseline during the beginning portion of a conversation and then monitoring to detect a substantial deviation from that baseline.

A control means 804 consists of that hardware and software necessary to both engage the CMS 800 for a particular call and to associate a specific trigger action with a particular voice-recognized key word or phrase or speech-analyzed voice quality condition. The engagement aspect of the control means may operate in much the same was as the engagement control means 202 of the CFMS 100, discussed above. The trigger aspect of the control means 804 operates by associating a specific trigger action with a particular predetermined condition, such as a word or phrase recognized by the voice recognition mean 802 or with a particular voice quality condition recognized by the speech analysis means 803, for example by means of a computerized database lookup function. Once the control means 804 has identified the appropriate trigger response, the control means 804 identifies the specific instructions associated with the identified trigger response. The control means 804 then performs the identified instruction. Generally, the instruction may be to generate one or more types of reports, record data and/or to notify and/or transfer the call to a live supervisor. In addition, the triggered action may be to request customer feedback.

A reporting means 805 generates a number of different types of reports based on the information it receives from the control means 804.

A supervisory means 806 includes the hardware and software necessary for providing a live on-line service evaluator to receive calls that are sent by the control unit to the live supervisor for real time service assistance.

Although the present invention has been illustrate in the context of a telecommunications service provider, the contemplated scope of the invention extends to other types of communication links, and to situations other than telephone directory assistance information services. For instance, the monitoring function of the invention could find potential applicability to a keyed or other type of non-voice exchange of information occurring over an internet communication link. In addition, the invention contemplates that the service provider could be an internal corporate entity, such as switchboard operators or network administrators, or relate to other services, such as catalog sales, banking and/or insurance services, automatic call answering systems for government and businesses, or virtually any other situation where a customer interacts with a live or automated agent of a service provider. Thus, various modifications could be made to the disclosed preferred embodiments without departing from the intended scope of the invention, which is defined by the claims set forth below.

The invention claimed is:

1. A method of monitoring a provision of a service comprising the steps of:
    establishing a communication link with an automated agent of a service provider that originates from a customer;
    monitoring an exchange of information between said customer and said automated agent of said service provider, and said exchange of information relating to a service;
    triggering an action if said monitoring step detects a predetermined condition, and said predetermined condition includes at least one of a predetermined utterance, a predetermined keyed entry, and a predetermined change in a qualitative aspect of a spoken portion of said exchange of information; and
    said action includes requesting feedback from said customer regarding said service before the communication link is terminated.

2. The method of claim 1 wherein said communication link includes at least one of a wireless link, a telecommunications link, an internet link and an ISDN link.

3. The method of claim 1 wherein said predetermined change includes a change in voice tonal quality.

4. The method of claim 1 wherein said predetermined change includes a change in voice volume.

5. The method of claim 1 wherein said predetermined utterance includes a predetermined word.

6. The method of claim 1 wherein said action includes alerting a live agent of said service provider before said communication link is terminated.

7. The method of claim 1 wherein said action includes recording data relating to said exchange of information and agent identifying information.

8. The method of claim 1 wherein said establishing step is performed with a plurality of different customers; and said monitoring step is performed on a sampling basis.

9. The method of claim 8 wherein said action includes at least one of alerting live agent of said service provider, recording data relating to said exchange of information and requesting feedback from said customer regarding said service.

10. The method of claim 1 including a step of associating feedback from said customer with telecommunications server data that includes agent identifying information.

11. The method of claim 1 wherein said action includes generating a report.

12. The meted of claim 1 wherein said action includes recording data.

13. The method of claim 1 wherein said action includes notifying a live supervisor.

14. The method of claim 1 wherein said action includes transferring the communication link to a live supervisor.

15. The method of claim 1 wherein said monitoring step is performed during at least one of a plurality of critical conversation time points, which include a beginning of a call, prior to a position connect with the agent, during a position connect with the agent, after a position connect with the agent, after an audio response but before a call release, and an end of a call.

16. The method of claim 1 wherein said predetermined change is determined in part by establishing a baseline during the beginning portion of a conversation; and
    the monitoring step includes monitoring to detect a substantial deviation from said baseline.

17. The method of claim 16 wherein said baseline is established from said customer.

18. The method of claim 1 wherein said monitoring step includes announcing at least one message to said customer during at least one of a plurality of critical conversation time points, which include a beginning of a call, prior to a position connect with the agent, during a position connect with the agent, after a position connect with the agent, after an audio response but before a call release, and an end of a call.

19. The method of claim 18 wherein said message includes an announcement that the exchange of information may be monitored.

20. The method of claim 18 wherein said message includes an announcement requesting feedback on a qualitative aspect of said service provided by said agent.

21. The method of claim 18 wherein said message includes an announcement relating to a triggered action, which includes at least one of generating a report, recording data, notifying a live supervisor, transferring the communication link to a live supervisor, and requesting feedback from said customer regarding said service before the communication link is terminated.

22. The method of claim 1 wherein said predetermined change includes a change in tonal quality in utterances originating from said customer.

23. The method of claim 1 wherein said monitoring step is performed in a continuous mode that includes engaging the monitoring step for every one of a plurality of calls for a specified period of time.

24. A system for monitoring a provision of a service comprising:
    a communication link between a customer and an automated agent of a service provider that originates from said customer;
    an exchange of information between said customer and said automated agent of said service provider, said information relating to a service;

a monitoring device coupled to said communication link;
a triggered action if said monitoring device detects a predetermined condition that includes at least one of a predetermined utterance, a predetermined keyed entry, and a predetermined change in qualitative aspect of a spoken portion of said exchange of information;
a customer feedback system; and
said triggered action includes an activation of said customer feedback system before said communication link is terminated.

25. The system of claim 24 wherein said communication link includes at least one of a wireless link, a telecommunications link, an internet link and an ISDN link.

26. The system of claim 24 wherein said monitoring device includes a voice tonal change detector; and
said predetermined condition includes a change in voice tonal quality.

27. The system of claim 24 wherein said monitoring device includes a voice volume change detector; and
said predetermined condition includes a change in voice volume.

28. The system of claim 24 wherein said monitoring device includes a speech recognition subsystem.

29. The system of claim 24 wherein said monitoring device includes a keyed entry recognition subsystem.

30. The system of claim 24 wherein said triggered action includes an alert to a live agent of said service provider before said communication link is terminated.

31. The system of claim 24 further comprising a recorder coupled to said communication link; and
said triggered action includes an activation of said recorder.

32. The system of claim 31 wherein said recorder stores data that includes at least one of said predetermined condition and agent identifying information.

33. The system of claim 24 wherein said service provider provides services to a plurality of different customers; and
said monitoring device is activated on a sampling basis.

34. The system of claim 33 wherein said monitoring device includes at least one of a voice volume change detector, a voice tonal change detector, a speech recognition subsystem and a character string recognition subsystem; and
said action includes at least one of an alert to a live agent of said service provider, an activation of a recorder and an activation of said customer feedback system.

35. The system of claim 24 further comprising a customer feedback system;
said triggered action includes an activation of said customer feedback system before said communication link is terminated; and
said customer feedback system including means for associating feedback from said customer with telecommunications server data that includes agent identifying information.

36. A method of monitoring a provision of a service comprising the steps of:
establishing a communication link with an agent of a service provider that originates from a customer;
monitoring an exchange of information between said customer and said agent of said service provider, and said exchange of information relating to a service;
triggering an action by the service provider if said monitoring step detects a predetermined condition, and said predetermined condition includes at least one of a predetermined utterance, a predetermined keyed entry, and a predetermined change in a qualitative aspect of a spoken portion of said exchange of information;
wherein said monitoring step is performed in an auto-sampling mode that includes engaging the monitoring step on a statistically valid intermittent basis;
wherein said auto-sampling mode includes engaging the monitoring step based on screening data derived from a telecommunications server, and
wherein said screening data includes a class and a type of call to be sampled.

37. The method of claim 36 wherein said screening data includes a number of calls to be sampled.

38. The method of claim 37 wherein said number of calls are associated with at least one of an individual live agent, an agent manager, and an agent office.

39. The method of claim 36 wherein said predetermined condition includes utterance of a predetermined word.

40. The method of claim 39 wherein said predetermined word includes a word relating to a quality of service issue.

41. The method of claim 39 wherein said predetermined word includes a word relating to a marketing issue.

* * * * *